(12) United States Patent
Weder

(10) Patent No.: US 8,757,430 B2
(45) Date of Patent: Jun. 24, 2014

(54) DECORATIVE ELEMENTS PROVIDED WITH A CURLED OR CRIMPED CONFIGURATION AT POINT OF SALE OR POINT OF USE

(75) Inventor: Donald E. Weder, Highland, IL (US)

(73) Assignee: Wanda M. Weder & William F. Straeter, Highland, IL (US), not individually but solely as Trustees of The Family Trust U/T/A ( * ) Notice: Subject to any disclaimer, the term of this patent is extended or adjusted under 35 U.S.C. 154(b) by 0 days.

(21) Appl. No.: 13/483,203

(22) Filed: May 30, 2012

(65) Prior Publication Data

US 2012/0238429 A1    Sep. 20, 2012

Related U.S. Application Data

(63) Continuation of application No. 13/274,454, filed on Oct. 17, 2011, now abandoned, which is a continuation of application No. 13/036,426, filed on Feb. 28, 2011, now abandoned, which is a continuation of application No. 11/929,977, filed on Oct. 30, 2007, now abandoned, which is a continuation of application No. 11/247,426, filed on Oct. 11, 2005, now abandoned.

(51) Int. Cl.
    *B32B 37/00*    (2006.01)
(52) U.S. Cl.
    USPC .................. 221/33; 221/49; 428/15; 428/17; 428/25
(58) Field of Classification Search
    USPC ............................ 221/33, 49; 428/15, 17, 25
    See application file for complete search history.

(56) References Cited

U.S. PATENT DOCUMENTS

| | | | |
|---|---|---|---|
| 2,149,544 A | | 3/1939 | Phillips et al. |
| 2,649,303 A | * | 8/1953 | Fuller ............... 271/65 |
| 3,416,991 A | | 12/1968 | Shohei |
| 3,785,591 A | | 1/1974 | Stalmach, Jr. |
| 3,883,953 A | | 5/1975 | Saullo et al. |
| 3,904,467 A | | 9/1975 | Srail |
| 3,940,522 A | | 2/1976 | Wessells |
| 4,229,523 A | | 10/1980 | Ohta et al. |
| 4,589,683 A | | 5/1986 | Kearns |
| 4,765,934 A | | 8/1988 | Nazar et al. |
| 4,781,306 A | * | 11/1988 | Smith ............... 221/33 |
| 4,859,083 A | | 8/1989 | Nocek et al. |
| 5,072,515 A | | 12/1991 | Heitz |
| 5,080,254 A | * | 1/1992 | Feer ................. 221/33 |
| 5,143,250 A | * | 9/1992 | Freitag ............. 221/59 |
| 5,188,691 A | | 2/1993 | Caputo |
| 5,205,007 A | | 4/1993 | Goldstein |
| 5,232,132 A | | 8/1993 | Broussard et al. |
| 5,407,417 A | | 4/1995 | Goldstein |
| 5,891,286 A | * | 4/1999 | Weder ............... 156/163 |
| 5,906,280 A | | 5/1999 | Weder |
| 5,992,637 A | * | 11/1999 | Weder ............... 206/584 |

(Continued)

FOREIGN PATENT DOCUMENTS

| JP | 2005212438 | 8/1993 |
|---|---|---|
| JP | 2006264105 | 9/1994 |

(Continued)

*Primary Examiner* — Jeff Aftergut
(74) *Attorney, Agent, or Firm* — Dunlap Codding, P.C.

(57) ABSTRACT

Decorative grass and methods of providing same are disclosed wherein the decorative grass is either maintained in flattened configuration until restraint is removed and/or the decorative grass is curled and/or crimp at a point of use and/or sale.

4 Claims, 10 Drawing Sheets

(56) References Cited

U.S. PATENT DOCUMENTS

| | | |
|---|---|---|
| 6,281,327 B1 | 8/2001 | Lanza |
| 2006/0160453 A1 | 7/2006 | Suh |
| 2008/0018033 A1 | 1/2008 | Hiroki et al. |
| 2008/0053606 A1* | 3/2008 | Weder .......................... 156/250 |
| 2009/0123681 A1* | 5/2009 | Weder .......................... 428/35.7 |

FOREIGN PATENT DOCUMENTS

| | | |
|---|---|---|
| JP | 2006297032 | 10/1994 |
| JP | 2006297033 | 10/1994 |
| JP | 2007110935 | 5/2007 |
| WO | WO 03077670 | 9/2003 |

* cited by examiner

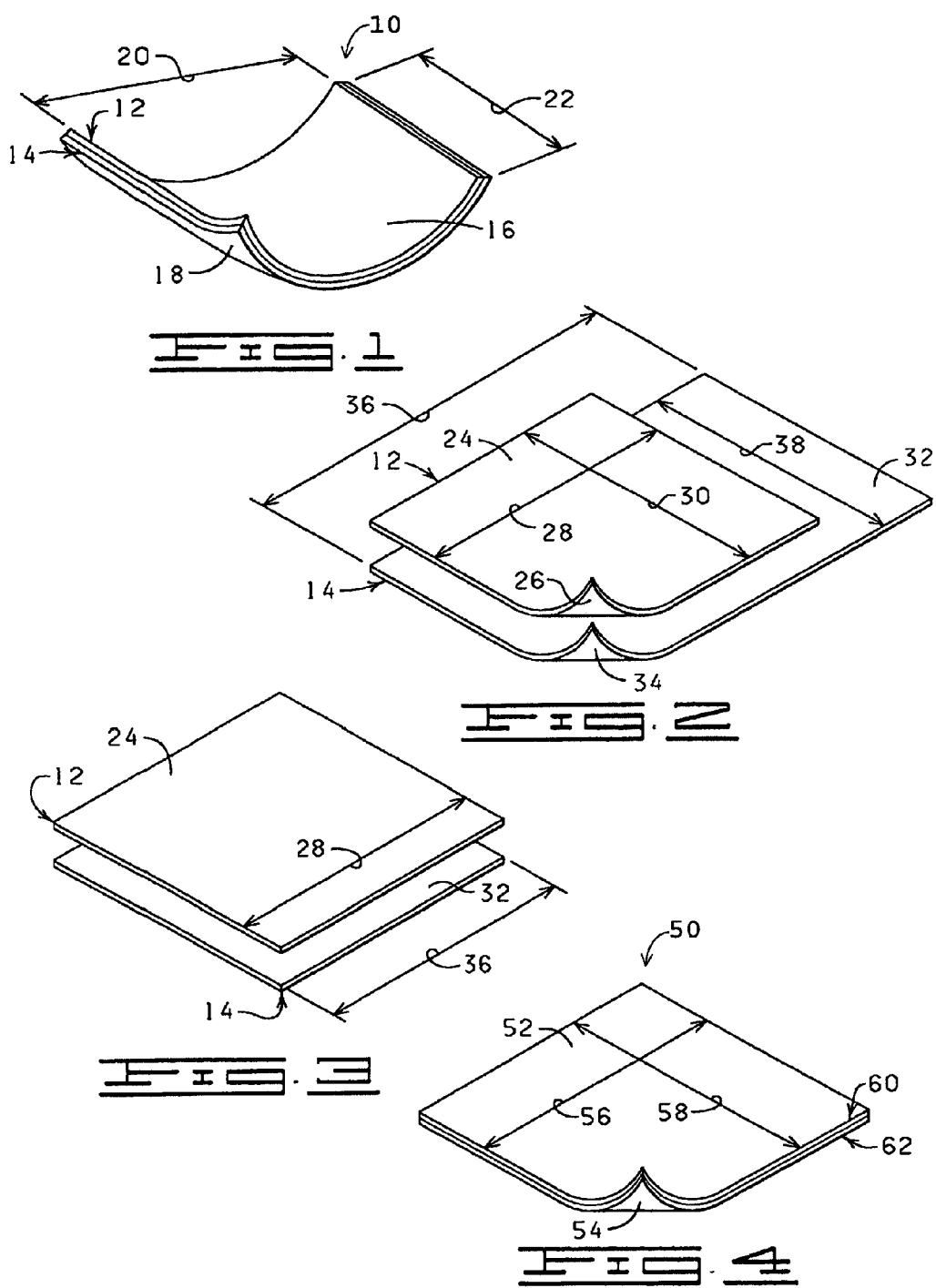

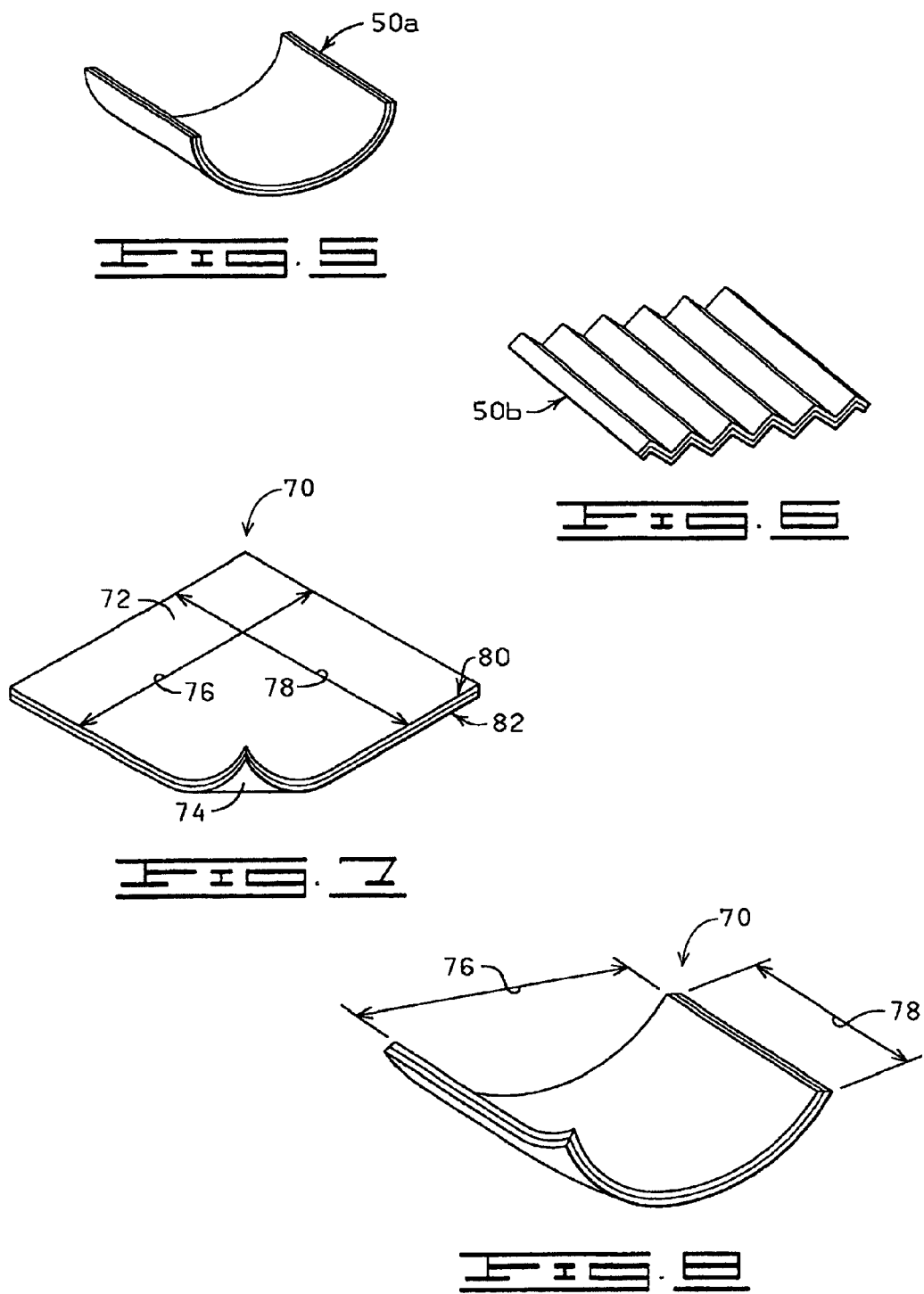

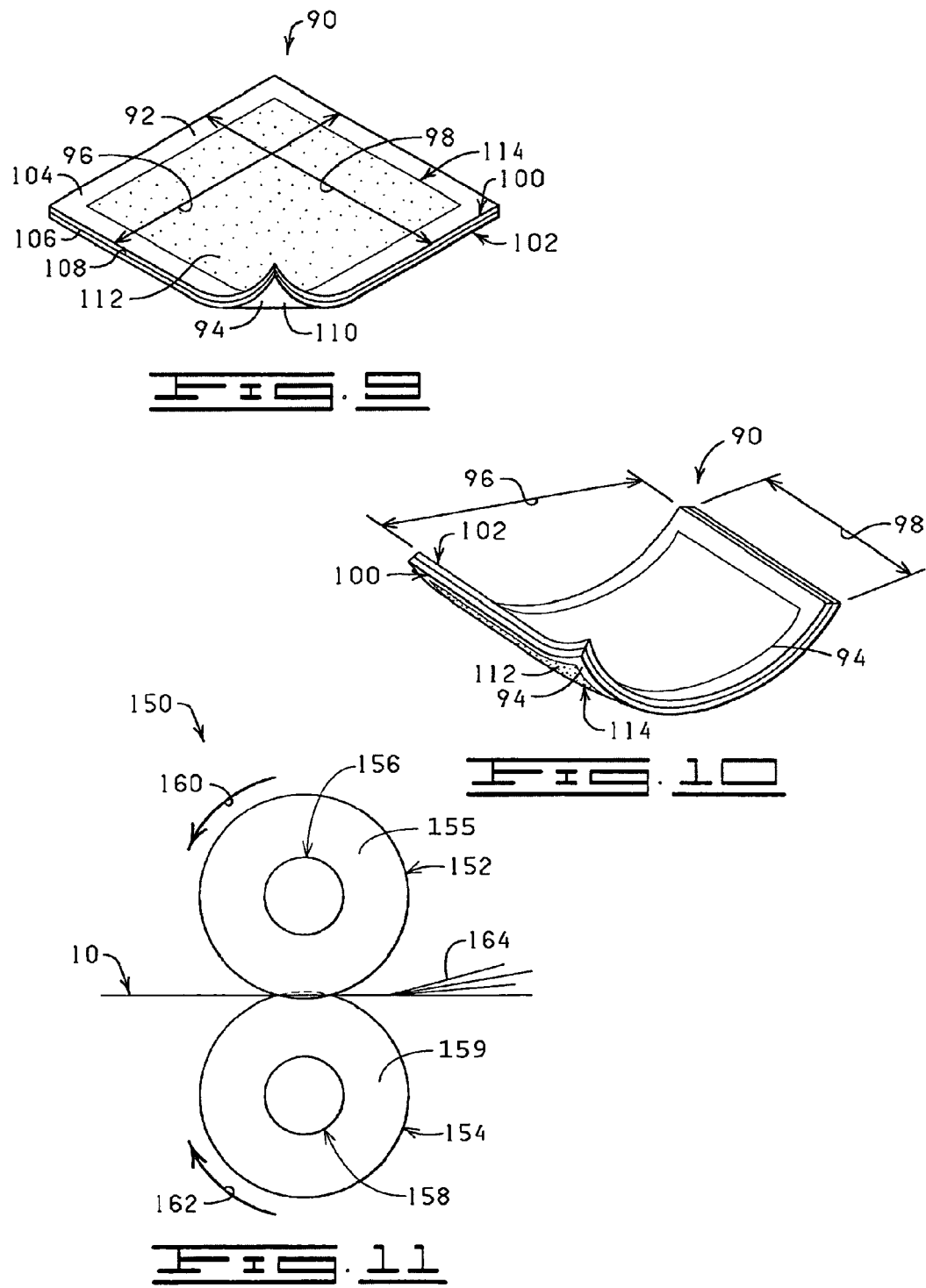

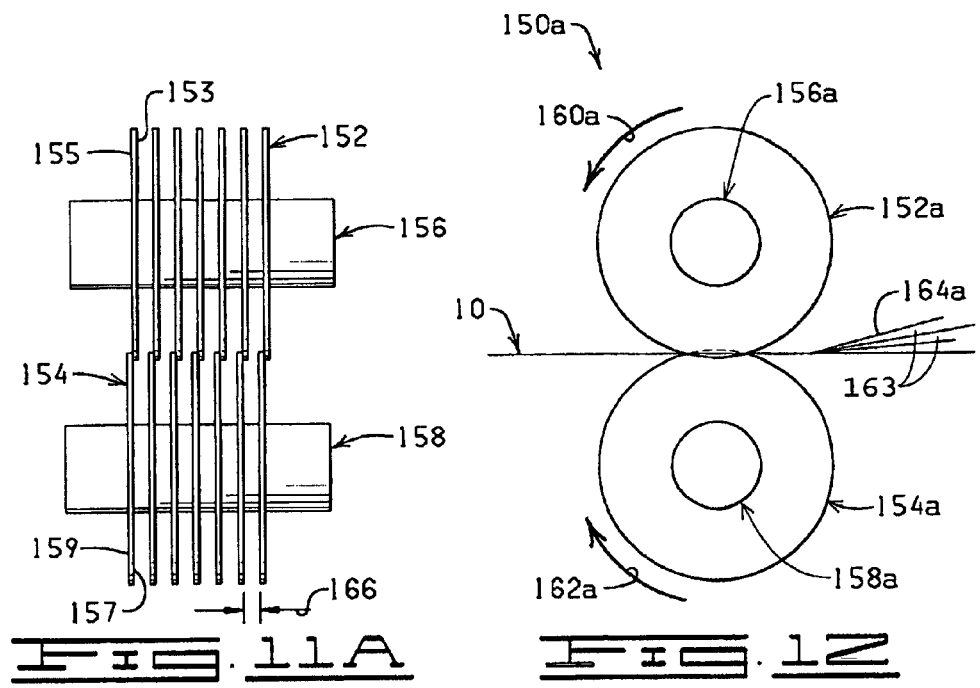
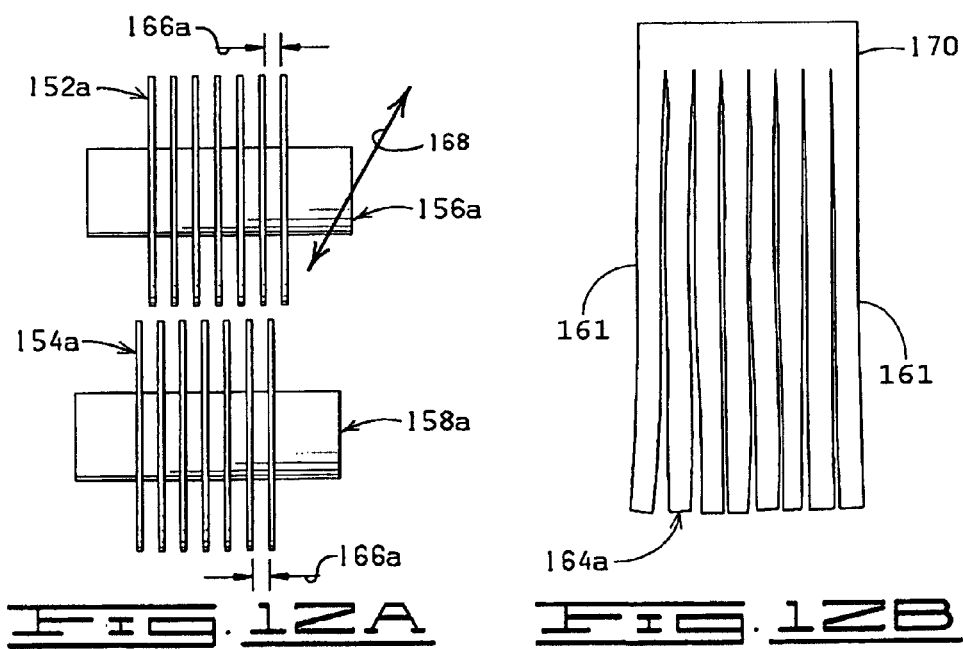

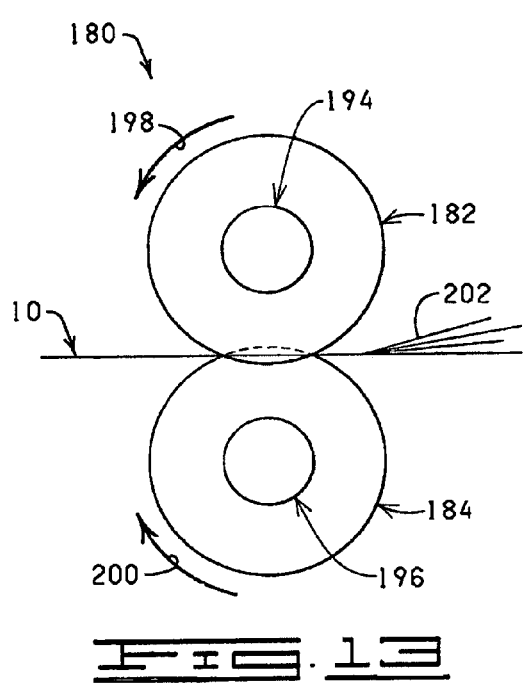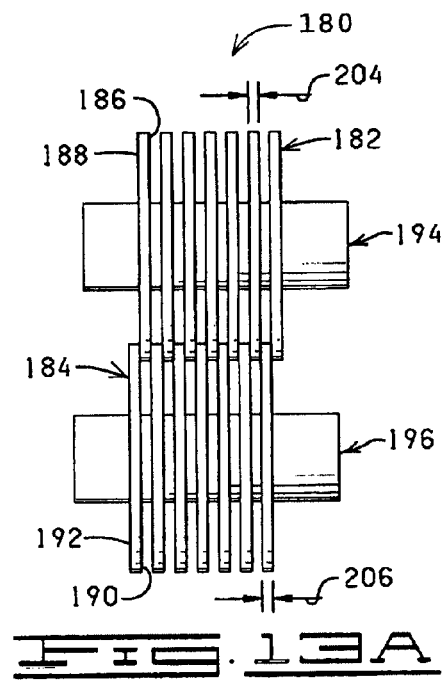
Fig.13  Fig.13A
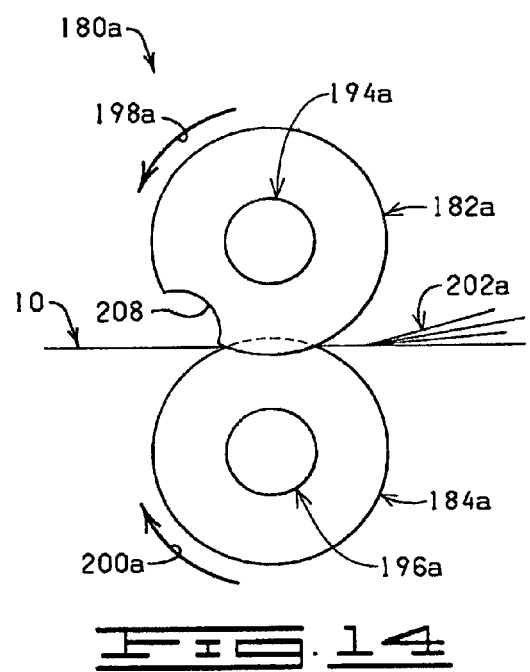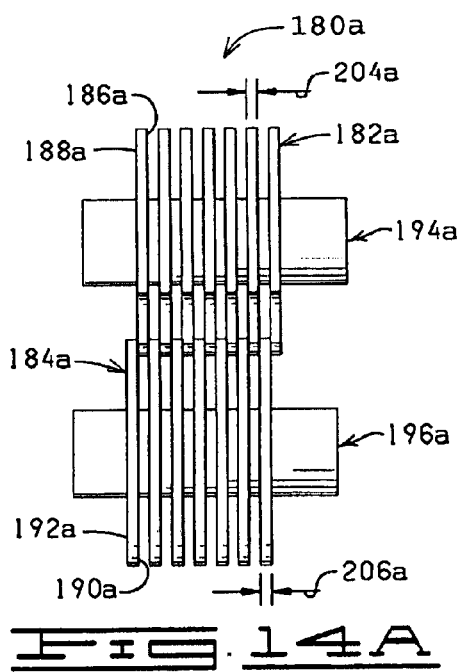
Fig.14  Fig.14A

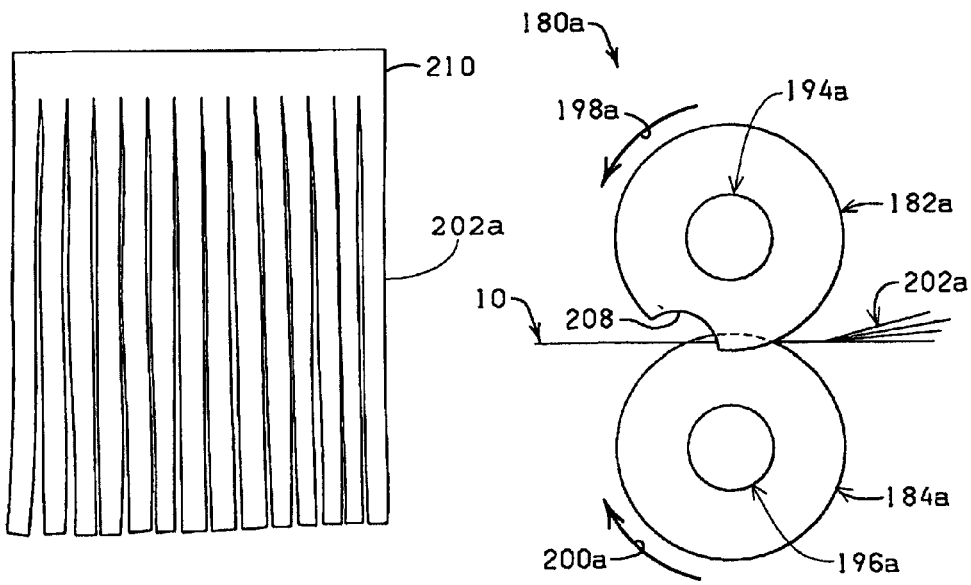
FIG. 14B    FIG. 15
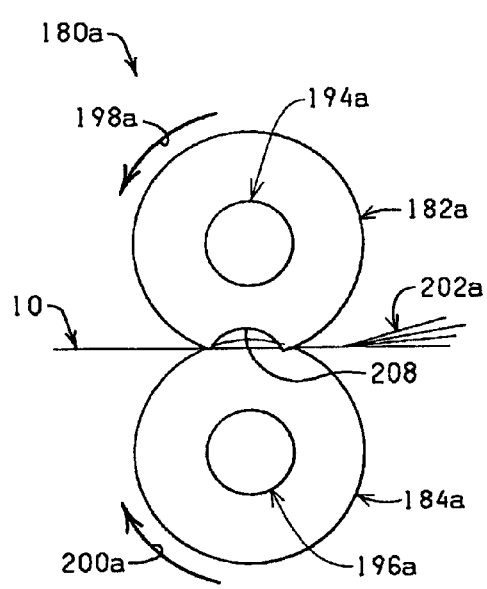    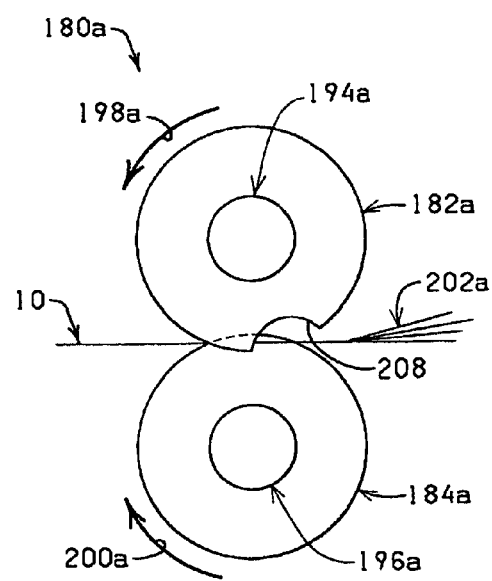
FIG. 16    FIG. 17

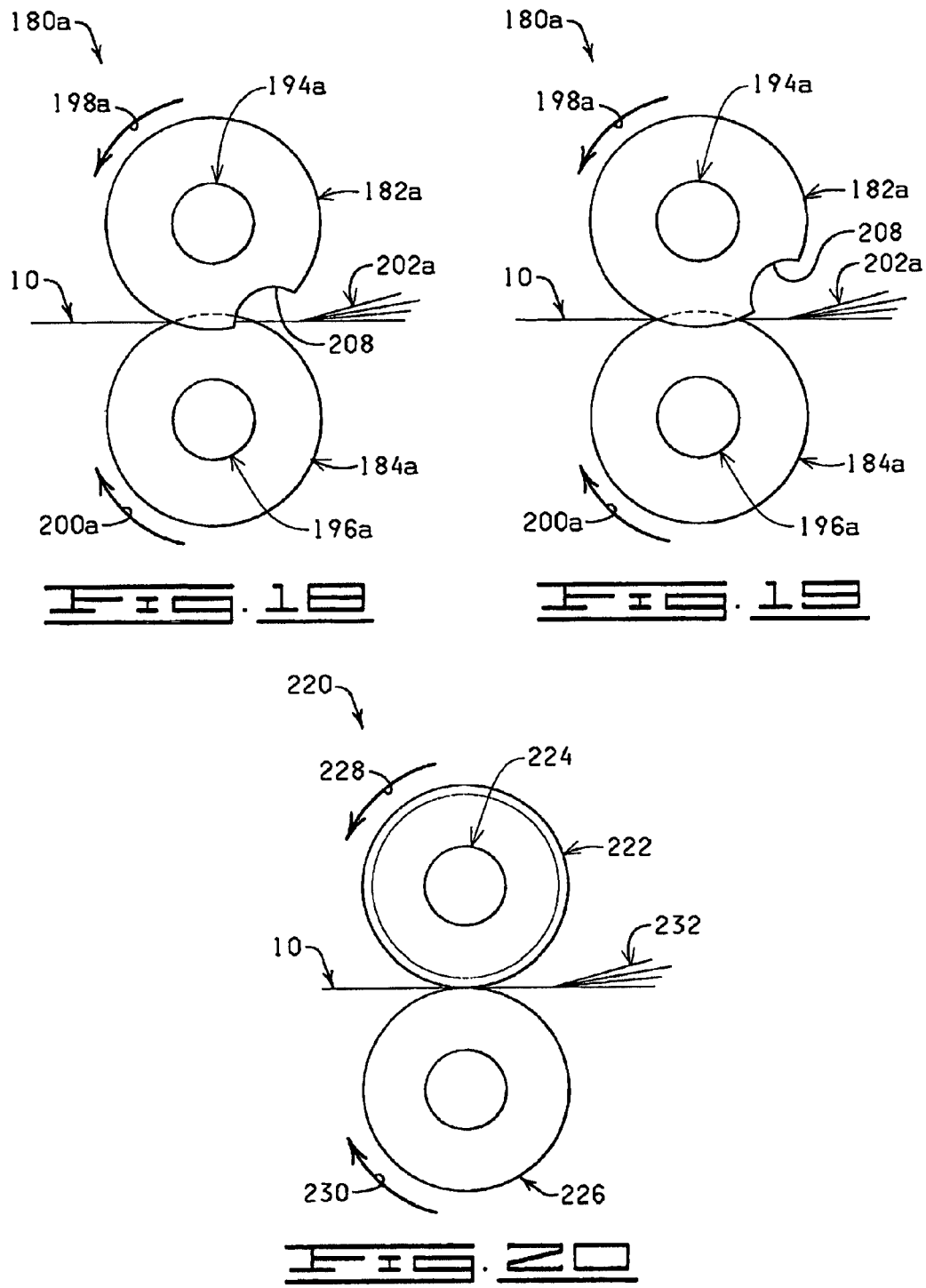

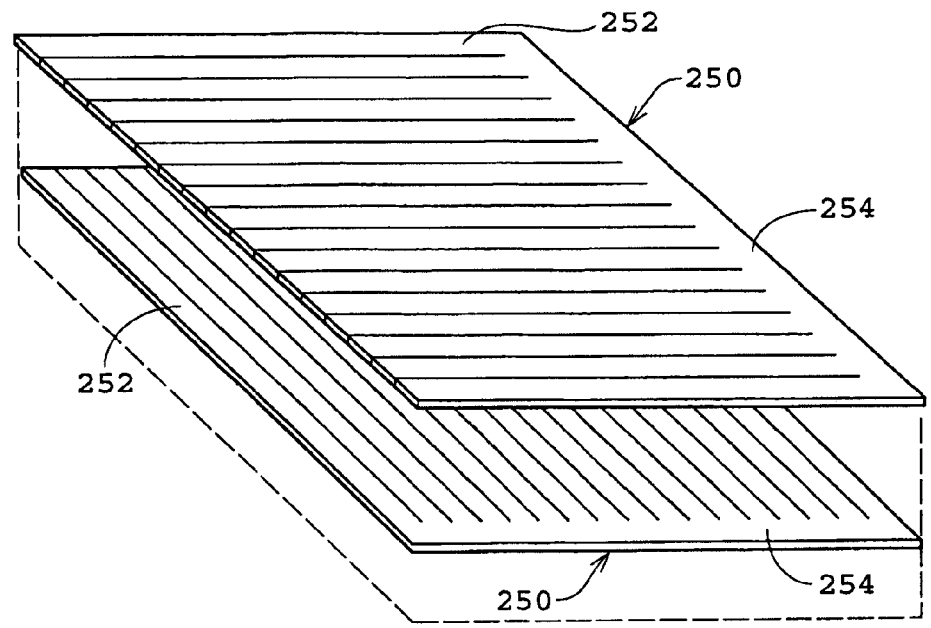
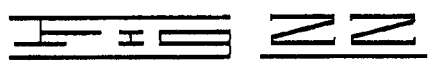
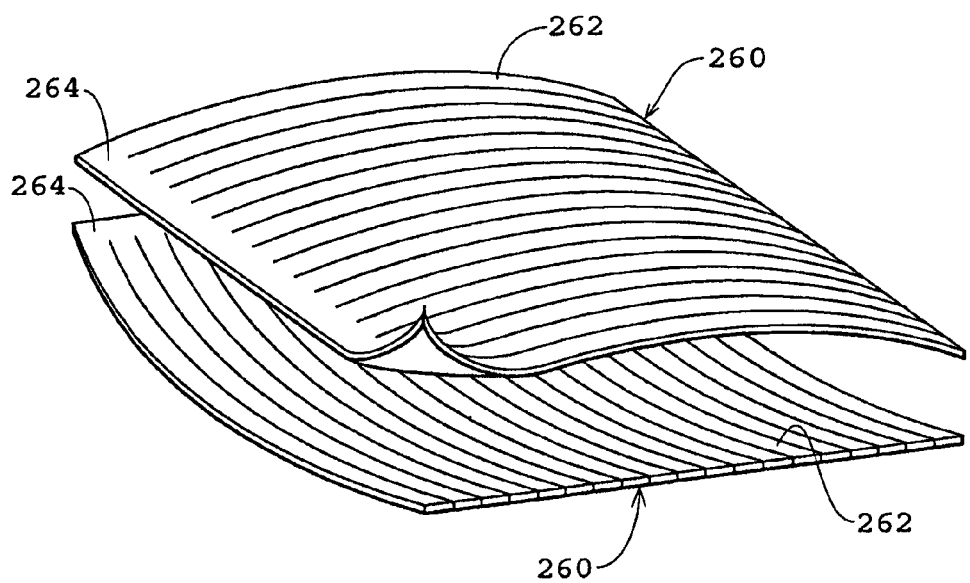
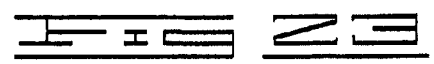

DECORATIVE ELEMENTS PROVIDED WITH A CURLED OR CRIMPED CONFIGURATION AT POINT OF SALE OR POINT OF USE

CROSS REFERENCE TO RELATED APPLICATIONS

This application is a continuation of U.S. Ser. No. 13/274,454, filed Oct. 17, 2011, now abandoned; which is a continuation of U.S. Ser. No. 13/036,426, filed Feb. 28, 2011, now abandoned; which is a continuation of U.S. Ser. No. 11/929,977, filed Oct. 30, 2007, now abandoned; which is a continuation of U.S. Ser. No. 11/247,426, filed Oct. 11, 2005, now abandoned. The entire contents of each of the above-referenced patents and patent applications are hereby expressly incorporated herein by reference.

STATEMENT REGARDING FEDERALLY SPONSORED RESEARCH OR DEVELOPMENT

Not Applicable.

FIELD OF THE INVENTION

The presently disclosed and claimed inventive concept(s) relates to decorative elements and decorative grass and methods for producing same, and more particularly, but not by way of limitation, to decorative elements and decorative grass provided in a substantially flat configuration which, upon activation, assumes a curled or crimped configuration at the point of sale or point of use, as well as methods for producing same.

BACKGROUND

Decorative grass has been used for many years in Easter baskets and for other decorative purposes. The decorative grass of the prior art has been produced by numerous methods and from a variety of materials such as polymeric materials, paper or the like. Typically, such materials are cut and shredded to produce segments having predetermined dimensions. One such prior art method for making decorative grass is disclosed in U.S. Pat. No. 4,292,266, issued to Weder et al. on Sep. 29, 1981, wherein a plastic film is extruded and cut into plastic strips which are passed through a slow-speed godet, an oven and a high-speed godet so that the strips are drawn down in width and thickness without breaking. From the high-speed godet, the strips or strands are chopped to a desired length and conveyed to a storage area for subsequent bagging and packaging.

Traditionally, the decorative grasses are provided as individual, unattached segments of decorative grass. Such segments of decorative grass may be provided with certain conformations which provide volume and bulk to the packaging. For example, U.S. Ser. No. 09/586,901, entitled "METHOD AND APPARATUS FOR MAKING CURLED DECORATIVE GRASS", which is hereby expressly incorporated herein by reference, discloses a method of providing curled configurations to decorative grass to provide improved bulk and volume to the decorative grass.

While the prior art methods for making decorative grass have been widely accepted, new and improved methods for making, packaging, storing, shipping and displaying decorative grasses are being sought. It is to such decorative grasses and methods for producing same that the presently disclosed and claimed inventive concept(s) is directed.

BRIEF DESCRIPTION OF THE DRAWINGS

FIG. 1 is a perspective view of a sheet or web of laminated material constructed in accordance with the presently disclosed and claimed inventive concept(s), the sheet or web of laminated material having a distortion set therein.

FIG. 2 is a perspective view of a first sheet or web of material and a second sheet or web of material from which the sheet or web of laminated material of FIG. 1 is constructed, the first sheet or web of material being provided with a length which is less than a length of the second sheet or web of material.

FIG. 3 is a perspective view of the first and second sheets or webs of material of FIG. 2 wherein the length of the first sheet or web of material has been stretched so that such length is the same as the length of the second sheet or web of material.

FIG. 4 is a perspective view of a sheet or web of laminated material having a substantially flat configuration.

FIG. 5 is a perspective view of the sheet or web of laminated material of FIG. 4 wherein the sheet or web of laminated material is curled.

FIG. 6 is a perspective view of the sheet or web of laminated material of FIG. 4 wherein the sheet or web of laminated material is crimped.

FIG. 7 is a perspective view of a sheet or web of laminated material constructed in accordance with the presently disclosed and claimed inventive concept(s), the sheet or web of laminated material constructed from a sheet or web of material having a substantially flat configuration and a sheet or web of heat shrinkable material.

FIG. 8 is a perspective view of the sheet or web of laminated material of FIG. 7 wherein the sheet or web of laminated material has been exposed to heat.

FIG. 9 is a perspective view of a sheet or web of laminated material constructed in accordance with the presently disclosed and claimed inventive concept(s), the sheet or web of laminated material formed of a sheet or web of material having a substantially flat configuration and a sheet or web of material having a hygroscopic agent disposed thereon.

FIG. 10 is a perspective view of the sheet or web of laminated material of FIG. 9 wherein the sheet or web of laminated material has been exposed to moisture.

FIG. 11 is a schematic representation of a system for producing decorative grass in accordance with the presently disclosed and claimed inventive concept(s).

FIG. 11A is a schematic representation of a first set of blades and a second set of blades of the system for producing decorative grass of FIG. 11.

FIG. 12 is a schematic representation of another embodiment of a system for producing decorative grass in accordance with the presently disclosed and claimed inventive concept(s).

FIG. 12A is a schematic representation of a first set of blades and a second set of blades of the system for producing decorative grass of FIG. 12, wherein the first set of blades may disengage the second set of blades.

FIG. 12B is a perspective view of strands of decorative grass produced from the system for producing decorative grass of FIG. 12 wherein the strands of decorative grass are connected to a header.

FIG. 13 is a schematic representation of another embodiment of a system for producing decorative grass in accordance with the presently disclosed and claimed inventive concept(s).

FIG. 13A is a schematic representation of a first set of blades and a second set of blades of the system for producing decorative grass of FIG. 13.

FIG. 14 is a schematic representation of yet another embodiment of a system for producing decorative grass in accordance with the presently disclosed and claimed inventive concept(s) wherein a first set of blades of the system for producing decorative grass are provided with a radius notch.

FIG. 14A is a schematic representation of the first set of blades and a second set of blades of the system for producing decorative grass of FIG. 14.

FIG. 14B is a perspective view of strands of decorative grass produced from the system for producing decorative grass of FIG. 14 wherein the strands of decorative grass are connected to a header.

FIG. 15 is a schematic representation of the system for producing decorative grass of FIG. 14 wherein the radius notch of the first set of blades is partially in contact with the second set of blades.

FIG. 16 is a schematic representation of the system for producing decorative grass of FIG. 14 wherein the radius notch of the first set of blades is in contact with the second set of blades.

FIG. 17 is a schematic representation of the system for producing decorative grass of FIG. 14 wherein the radius notch of the first set of blades is partially in contact with the second set of blades.

FIG. 18 is a schematic representation of the system for producing decorative grass of FIG. 14 wherein a small portion of the radius notch of the first set of blades is in contact with the second set of blades.

FIG. 19 is a schematic representation of the system for producing decorative grass of FIG. 14 wherein the radius notch of the first set of blades is not in contact with the second set of blades.

FIG. 20 is a schematic representation of yet another system for producing decorative grass in accordance with the presently disclosed and claimed inventive concept(s).

FIG. 22 is a perspective view of a pair of crosslaid layers of curlable segments of decorative grass wherein the curlable segments are connected to a header.

FIG. 23 is a perspective view of a pair of crosslaid layers of curled segments of decorative grass wherein the curled segments are connected to a header.

DETAILED DESCRIPTION OF THE INVENTIVE CONCEPT(S)

Figure 20A:
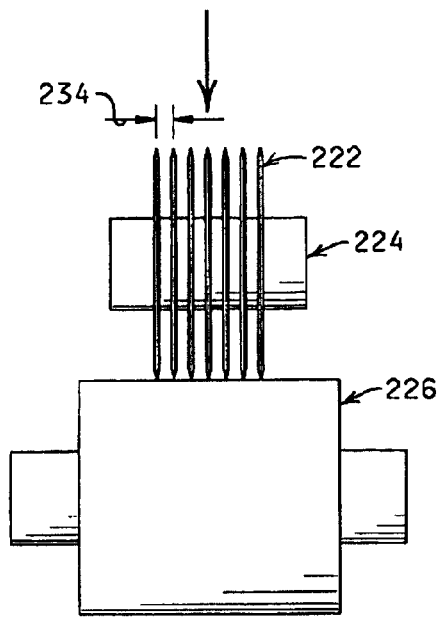
FIG. 20A is a schematic representation of a set of blades disposed on a blade mandrel and in contact with a hardened mandrel of the system for producing decorative grass of FIG. 20.

The presently disclosed and claimed inventive concept(s) relates to decorative grasses and methods for producing same. Broadly, the presently disclosed and claimed inventive concept(s) relates to decorative grasses produced in a substantially flat configuration which, upon activation, can assume a curled or crimped configuration, preferably at the point of sale or point of use, as well as improved methods of packaging, storing, shipping and displaying such decorative grasses. Such decorative grasses can also be utilized for non-decorative purposes, such as packing material, animal bedding, cat litter, mulch for soil and media for plants. In addition, the presently disclosed and claimed inventive concept(s) also relates to decorative elements, such as glitter, which are produced in a similar manner and which can be activated to assume a three-dimensional configuration, as well as methods for producing same.

An object of the presently disclosed and claimed inventive concept(s) is to provide a decorative grass having a substantially flat configuration which can be curled or crimped at a point of sale or point of use.

Another object of the presently disclosed and claimed inventive concept(s), while achieving the before-stated object, is to provide a method for producing a decorative grass having a substantially flat configuration which can be curled or crimped at a point of sale or point of use.

Yet another object of the presently disclosed and claimed inventive concept(s), while achieving the before-stated objects, is to provide a method for producing decorative elements having a substantially flat configuration which can be activated to assume a three-dimensional configuration.

Other objects, features and advantages of the presently disclosed and claimed inventive concept(s) will become apparent from the following detailed description when read in conjunction with the accompanying drawings and appended claims.

The presently disclosed and claimed inventive concept(s) relates to a decorative grass having an activatable curling agent. Such decorative grass is produced by cutting or shredding a sheet or web of material having the activatable curling agent disposed thereon or incorporated therein. Individual strands of decorative grass produced therefrom are provided with a substantially flat configuration, and the strands of decorative grass will remain flat until heated, wetted, and treated with a solvent or other methods known in the art to activate the curling agent and thereby produce curls in the strands of decorative grass. Optionally, upon activation, strands of decorative grass may be provided with crimps or a combination of crimps and curls, depending on the distribution of activatable curling agent on the strands of decorative grass. Such decorative grass could be shipped and stored in a flattened condition and curled at or near the point of use so as to reduce freight costs, warehousing space and shelf space in a retail outlet.

The presently disclosed and claimed inventive concept(s) also relates to decorative grass which is produced with a curled or crimped configuration and retained in the flattened form at the production stage, as well as decorative grass allowed to curl at the production stage and re-flattened following production. Such decorative grass is then stored, shipped and displayed in the flattened form with the decorative grass being released to curl or crimp at or near the point of use. The curl or crimp could be retained in the flattened form by putting the decorative grass or the sheet or web of material from which the decorative grass is produced in a bag or other package of sufficient rigidity to prevent the material from curling or crimping. Optionally, the sheet or web of material or the decorative grass formed therefrom may be wound onto a roll. In a further alternative, the individual segments or strands of decorative grass may remain attached to an attachment area or header and the attachment area or header may be formed of another piece of material or to a dissimilar material such as cardboard, and the decorative grass may be retained in the flattened form by holding the attachment area or header with staples, adhesive, clips or other materials. For example, strands of decorative grass which have already been stretched so as to enable their curling when tension is released may be wrapped around a flat piece of plastic or cardboard so as to keep them in the flattened condition during storage and shipping. Such decorative grass may be released and allowed to curl or crimp at the point of sale or point of use by cutting or tearing the strands or segments of decorative grass from the attachment area or header or by simply freeing the attachment area or header from the rigid package and allowing the grass to curl or crimp while remaining attached at one or more attachment areas or headers. The attachment areas or headers provide an additional advantage in that they keep the strands or segments of decorative grass together in a neat bundle which provides for a decorative appearance but which also provide a cushioning effect so as to prevent damage to contents of baskets or boxes or other packages while avoiding the problem of having to clean up spilled strands of decorative grass.

The presently disclosed and claimed inventive concept(s) also relates to an assembly and method for producing curled decorative grass at or near the point of use and/or sale of the curled decorative grass. To provide a curled or crimped decorative grass at or near a point of use or sale, at least one sheet or web of material is provided at or near the point of sale, the at least one sheet or web of material capable of having a curled imparted thereto. A curl or crimp is formed in the at least one sheet or web of material at or near the point of sale or use to form a distortion therein. The distorted sheet or web of material is then cut into strands of decorative grass at or near the point of sale or use of the decorative grass.

Another method of providing a decorative grass at or near the point of use or sale is to provide at least one curled sheet or web of material at or near a point of sale or use. Pressure is maintained on the at least one curled sheet or web of material so that the curled sheet or web of material is maintained in a substantially flat configuration. While maintained in the substantially flat configuration the curled sheet or web of material is cut into strands of decorative grass at or near the point of sale or use. If desired, the curled sheet or web of material can maintained in a non-flattened condition at or near the point of sale in which case the curled sheet or web of material is cut into strands at or near the point of use or sale while in the non-flattened condition.

As previously stated, the presently disclosed and claimed inventive concept(s) also relates to an assembly for producing curled decorative grass at or near a point of use or sale. The assembly includes an enclosure containing a plurality of sheets or web of material capable of having a curl imparted thereto. The enclosure is provided with an opening for permitting removal of at least one sheet at a time or at least a portion of the web of material from the enclosure. The enclosure is positioned at or near a point of sale or use of the curl of decorative grass. A curling tool capable of imparting a curl to the sheet or at least a portion of the web of material is also provided such that when at least one of the sheets or at least a portion of the web of material is withdrawn from the enclosure and brought into contact with the curling tool, a curled sheet of material or curled web of material is produced at or near the point of sale or use of decorative grass. Thereafter, the curled sheets or the curled web of material are cut to provide decorative grass at or near the point of sale or use of the decorative grass with a cutting tool.

If desired, the sheets of material can be provided with a plurality of segments which are connected to a header. The sheets of material, once curled, can then be separated, if desired, by cutting the segments off the header. Further, it should be noted that the sheets of material and/or web of material can already have a curl imparted thereto, and if the sheets of material are provided with a plurality of side by side segments, such side by side segments may be connected to a header which can be removed at or near the point of sale or use of the decorative grass.

Description of FIGS. 1-3

Referring now to the Drawings, shown in FIG. 1 is a sheet or web of laminated material 10 from which decorative grass can be produced in accordance with the presently disclosed and claimed inventive concept(s), the sheet or web of laminated material 10 having a distortion set therein. The distortion is illustrated as being a curl; however, it should be understood that the distortion may also be at least one crimp, as will be described in more detail hereinafter. The sheet or web of laminated material 10 is formed of a first sheet or web of material 12 and a second sheet or web of material 14. The sheet or web of laminated material 10 has an upper surface 16, a lower surface 18, a length 20 and a width 22.

Any sheet or web of material capable of being laminated to another sheet or web of material and capable of having a curl or crimp imparted thereto can be employed as the sheets or webs of material 12 and 14. However, desirable results can be achieved wherein the sheets or webs of material 12 and 14 are constructed from materials selected from the group consisting of paper, crepe paper, polymeric film, wax paper, paper having a shape sustaining agent or lacquer applied to at least a portion of one surface thereof, foil, metallized film, cloth, burlap and any combination or lamination thereof. The sheets or webs of material 12 and 14 may be provided with any thickness, as long as the sheets or webs of material 12 and 14 can function in accordance with the presently disclosed and claimed inventive concept(s). Desirably, each of the sheets or webs of material 12 and 14 are provided with a thickness in a range of from about 0.1 mil to about 30 mil.

At least one of the sheets or webs of material 12 and 14 may be provided with a printed pattern and/or an embossed pattern disposed on at least a portion of one surface thereof, and the embossed pattern may be either in register or out of register with the printed pattern, or a portion of the embossed pattern may be in register with the printed pattern and a portion of the embossed pattern may be out of register with the printed pattern. The sheets or webs of material 12 and 14 may also vary in color.

As shown in FIGS. 2 and 3, the first sheet or web of material 12 of the sheet or web of laminated material 10 is provided with an upper surface 24, a lower surface 26, a length 28 and a width 30. The second sheet or web of material 14 of the sheet or web of laminated material 10 is provided with an upper surface 32, a lower surface 34, a length 36 and a width 38. The first sheet or web of material 12 is provided with a dimension which is less than the associated dimension of the second sheet or web of material 14; that is, the width 30 of the first sheet or web of material 12 may be less than the width 38 of the second sheet or web of material 14, or the length 28 of the first sheet or web of material 12 may be less than the length 36 of the second sheet or web of material 14. The first sheet or web of material 12 is thus stretched in one dimension to provide such dimension with the same size as the associated dimension of the second sheet or web of material 14, and then the two sheets or webs of material 12 and 14 are laminated together. For example, as shown in FIG. 2, the length 28 of the first sheet or web of material 12 is less than the length 36 of the second sheet or web of material 14, and as shown in FIG. 3, the first sheet or web of material 12 is stretched lengthwise so that the length 28 thereof is substantially the same as the length 36 of the second sheet or web of material 14. Following stretching of the first sheet or web of material 12, the two sheets or webs of material 12 and 14 are laminated together to form the sheet or web of laminated material 10, substantially as shown in FIG. 1. Following lamination, the length 28 of the first sheet or web of material 12 contracts back to its original size, thereby causing a curl to be formed in the length 20 of the sheet or web of laminated material 10, as shown in FIG. 1. Decorative grass formed from the sheet or web of laminated material 10 shown in FIG. 1 will possess a torsion spring type curl if the sheet or web of laminated material 10 is cut in the direction of stretch, while the decorative grass will possess a helical spring curl if the sheet or web of laminated material 10 is cut at an angle to the direction of stretch. Such methods of providing a preset curl in a laminated material are disclosed in U.S. Pat. No. 5,891,286, entitled "METHODS OF FORMING CURLED OR CRIMPED DECORATIVE ELEMENTS HAVING AN OPTICAL EFFECT", issued to Weder on Apr. 6, 1999, the Specification of which is hereby expressly incorporated herein by reference.

However, prior to allowing the sheet or web of laminated material 10 to assume a curled configuration, the substantially flat sheet or web of laminated material 10 may be disposed in a bag or package of sufficient rigidity and size to retain the sheet or web of laminated material 10 in a substantially flat configuration, thus preventing the sheet or web of laminated material 10 from curling. In addition, the sheet or web of laminated material 10 may be provided in the form of a roll of material, and the process of winding the sheet or web of material 10 onto the roll will provide sufficient pressure and rigidity to maintain the sheet or web of laminated material 10 in a substantially flat configuration until a portion of the sheet or web of laminated material 10 is unwound from the roll, thereby allowing such portion to assume the distorted configuration, i.e., a curled configuration. The process of cutting or shredding the sheet or web of laminated material 10 to provide strands of decorative grass will be discussed in detail herein after with regards to FIGS. 11-21B. In addition, the individual strands of decorative grass formed from the sheet or web of laminated material 10 may be held together at attachment points, as will be discussed in greater detail herein below, thereby providing easier manipulation of the strands of decorative grass, such as for placing between two pieces of cardboard or winding onto a roll.

Description of FIGS. 4-6

Shown in FIG. 4 is a sheet or web of laminated material 50 from which decorative grass may be produced in accordance with the presently disclosed and claimed inventive concept(s). The sheet or web of laminated material 50 is similar to the sheet or web of laminated material 10 described in detail herein above, except the sheet or web of laminated material 50 is produced in a substantially flat configuration and does not have a preset distortion therein. The sheet or web of laminated material 50 may be curled or crimped by any method known in the art before or after cutting or shredding the sheet or web of laminated material to produce strands of decorative grass, as will be described in detail hereinafter.

The sheet or web of laminated material 50 has an upper surface 52, a lower surface 54, a length 56 and a width 58. The sheet or web of laminated material 50 is formed of a first sheet or web of material 60 and a second sheet or web of material 62. The sheets or webs of material 60 and 62 may be constructed of the same materials and in a similar manner as the sheets or webs of material 12 and 14.

Following lamination of the first sheet or web of material 60 to the second sheet or web of material 62 to form the sheet or web of laminated material 50, the sheet or web of laminated material 50 may be curled to provide a curled sheet or web of laminated material 50a, as shown in FIG. 5, or crimped to provide a crimped sheet or web of laminated material 50b, as shown in FIG. 6. Methods and apparatus for providing a sheet of material with a curl or a crimp are described in detail in U.S. Pat. No. 5,891,286, which has previously been incorporated herein by reference. However, the presently disclosed and claimed inventive concept(s) is not limited to the use of such methods and apparatus, and any method know in the art for providing a curl or crimp to a sheet or web of material may be utilized in accordance with the presently disclosed and claimed inventive concept(s).

Following production of the curled sheet or web of laminated material 50a or the crimped sheet or web of laminated material 50b, such sheet or web of laminated material 50a or 50b may be cut or shredded as described hereinafter with reference to FIGS. 11-21B to form strands of decorative grass which are curled or crimped. However, the strands of decorative grass may be retained in a substantially flat configuration during shipping and storage and may not assume the curled or crimped configuration until at the point of sale or point of use. The sheet or web of laminated material 50 may be provided with a curl or crimp therein as described above, and the curled sheet or web of laminated material 50a or the crimped sheet or web of laminated material 50b may be maintained in the substantially flat configuration by placing such sheet or web of laminated material 50a or 50b in a rigid, strained configuration, such as by applying pressure thereto by placing such sheet or web of laminated material 50a or 50b between two pieces of cardboard or winding such sheet or web of laminated material 50a or 50b onto a roll. Following shredding to form strands of decorative grass (as described herein below), the strands of decorative grass may be held in a rigid, strained configuration in a similar fashion as described above with reference to the sheet or web of laminated material 10 having a preset distortion therein of FIG. 1 to maintain the decorative grass in a substantially flat configuration until curling or crimping is desired, such as at the point of sale or point of use. That is, the strands of decorative grass formed from the curled sheet or web of laminated material 50a (FIG. 5) or the crimped sheet or web of laminated material 50b (FIG. 6) may be held in a substantially flat configuration by placing the strands of decorative grass between two pieces of cardboard or by winding the strands of decorative grass on a roll. When desired to provide curling or crimping to the strands of decorative grass, the strands of decorative grass are removed from between the two pieces of cardboard or upon unwinding of the strands of decorative grass, thereby releasing the tension and pressure placed on the strands of decorative grass and providing a curled or crimped configuration thereto. Individual strands of decorative grass formed from the curled or crimped sheets or webs of laminated material 50a or 50b may be held together at attachment points, as will be discussed in detail herein below, thereby providing easier manipulation of the strands of decorative grass, such as by placing same between two pieces or cardboard of winding onto a roll.

While the sheet or web of laminated material 50 used in the methods described herein before with reference to FIGS. 4-6 is laminated, it is to be understood that the presently disclosed and claimed inventive concept(s) is not limited to the use of a laminated material in such a method. That is, a sheet or web of unlamented material i.e., a single sheet or web of material, may be utilized in a similar manner as described hereinbefore with reference to FIGS. 4-6 whereby the sheet or web of unlaminated material is curled or crimped and then cut or shredded to provide strands of decorative grass, and the sheet or web of unlaminated material or the strands of decorative grass formed therefrom are maintained in a substantially flat configuration until same are curled and/or crimped. The sheet or web of unlaminated material may be provided with a substantially flat configuration following curling and/or crimping and prior to cutting or shredding to form decorative grass, or the sheet or web of unlaminated material may maintain the curled and/or crimped configuration, and following cutting or shredding thereof to form strands of decorative grass, pressure may be applied to temporarily provide a substantially flat configuration to the strands of decorative grass which is maintained until curling and/or crimping is desired, such as at the point of sale or point of use.

In addition, the presently disclosed and claimed inventive concept(s) also includes a sheet or web of unlamented material formed of two or more sheets or webs of material which are unconnected. In this manner, the decorative grass is a mixture or two or more materials which are comingled and have the same crimped and/or curled configuration.

Description of FIGS. 7-10

Shown in FIG. 7 is a sheet or web of laminated material 70 from which decorative grass can be produced in accordance with the presently disclosed and claimed inventive concept(s). The sheet or web of laminated material 70 has an upper surface 72, a lower surface 74, a length 76 and a width 78.

The sheet or web of laminated material 70 includes a first sheet or web of material 80 and a second sheet or web of material 82. The second sheet or web of material 82 is provided with a substantially flat configuration. The second sheet or web of material 82 may be constructed of any material capable of having another sheet or web of material laminated thereto and capable of functioning as described herein. For example, the second sheet or web of material 82 may be constructed from paper, crepe paper, polymeric film, wax paper, paper having a shape sustaining agent or lacquer applied to at least a portion of one surface thereof, foil, metallized film, cloth, burlap and any combination or lamination thereof.

The first sheet or web of material 80 is constructed of a material which is provided with a substantially flat configuration, but which contracts or shrinks when exposed to a sufficient level of heat, while the second sheet or web of material 82 does not react by shrinking when exposed to the same temperature or sufficient level of heat as the first sheet or web of material 80. That is, the first sheet or web of material 80 shrinks at a lower temperature than the second sheet or web of material 82, or the first and second sheets or webs of material 80 and 82 both shrink in response to heat but at differential rates in the same temperature range. In this manner, the sheet or web of laminated material 70 may be shredded or cut to produce decorative grass wherein the individual strands of decorative grass are provided with a substantially linear, flat configuration. The strands of decorative grass may be packaged, stored, shipped and displayed in such a substantially linear, flat configuration, allowing the consumer to curl the decorative grass at the point of sale or use by heating the strands of decorative grass, such as by exposure of the decorative grass to a hair dryer or an oven, or by placing same between two sheets of cardboard in a microwave oven (so as to absorb the microwave energy). In this manner, the substantially flat, individual strands of decorative grass are more easily separated by the consumer than strands of decorative grass having curled or crimped configurations which are intertwined in a cohesive mass. In addition, such method allows for easy removal of a portion of the stands of decorative grass and easy storage of the remaining portion of the decorative grass for future use. However, it is to be understood that the presently disclosed and claimed inventive concept(s) is not limited to curling the decorative grass at the point of sale or the point of use, and decorative grass formed as described above may be curled at the point of production, if desired.

Optionally, the sheet or web of laminated material 70 may be curled by exposure to heat prior to cutting or shredding the sheet or web of laminated material 70 to form decorative grass. Shown in FIG. 8 is the sheet or web of laminated material 70 which has been exposed to heat, and therefore a curl has been formed along the length 76 thereof. Following curling of the sheet or web of laminated material 70, the curled sheet or web of laminated material 70 and/or the strands of decorative grass formed therefrom may be retained in a constrained condition as described in detail hereinabove which provides a substantially flat configuration thereto until such constraints are removed, thereby allowing the sheet or web of laminated material 70 or the strands of decorative grass formed therefrom to assume the relaxed, curled configuration.

In addition, while it is described and illustrated herein that the sheet or web of laminated material 70, and therefore the strands of decorative grass formed therefrom, is provided with a curl along the length 76 thereof, it is to be understood that the sheet or web of laminated material 70, as well as the strands of decorative grass formed therefrom, may be provided with a curl along the width 78 thereof, or the curl may be disposed diagonally and span both the length 76 and width 78 thereof.

Such strands of decorative grass may also be attached to an attachment point, as described in detail herein below. By providing an attachment point of the same material or dissimilar material to the individual strands of decorative grass, the strands of decorative grass can be manipulated in an easier manner, by holding the individual strands of decorative grass in the same direction and in substantially the same configuration and by preventing unwanted intertwining and comingling of the individual strands of decorative grass.

Other methods of providing the second sheet or web of material with a substantially flat configuration which can be activated to form a curled or crimped configuration may be utilized. Shown in FIG. 9 is a sheet or web of laminated material 90 from which decorative grass can be produced in accordance with the presently disclosed and claimed inventive concept(s). The sheet or web of laminated material 90 has an upper surface 92, a lower surface 94, a length 96 and a width 98.

The sheet or web of laminated material 90 includes a first sheet or web of material 100 and a second sheet or web of material 102. The first sheet or web of material 100 has an upper surface 104 and a lower surface 106 and is provided with a substantially flat configuration. The second sheet or web of material 102 has an upper surface 108 and a lower surface 110 and is also provided with a substantially flat configuration. At least a portion of the upper surface 108 of the second sheet or web of material 102 is laminated to the lower surface 106 of the first sheet or web of material 100.

The second sheet or web of material 102 may be constructed of any material capable of having another sheet or web of material laminated thereto and capable of functioning as described herein. For example, the second sheet or web of material 102 may be constructed from paper, crepe paper, polymeric film, wax paper, paper having a shape sustaining agent or lacquer applied to at least a portion of one surface thereof, foil, metallized film, cloth, burlap and any combination or lamination thereof.

The first sheet or web of material 100 contains a hygroscopic agent 112 which is activated by exposure to moisture, wherein the hygroscopic agent 112 expands upon exposure to moisture and thereby imparts a curl to the first sheet or web of material 100 and thus to the sheet or web of laminated material 90 formed therefrom and/or to the strands of decorative grass cut from the sheet or web of laminated material 90. The hygroscopic agent 112 may be incorporated in the first sheet or web of material 100 upon formation of the first sheet or web of material 100, or the hygroscopic agent 112 may be applied to at least a portion of one of the upper and lower surfaces 104 and 106 of the first sheet or web of material 100. For example, as shown in FIG. 9, the hygroscopic agent 112 is incorporated in a lacquer, such as an acrylic lacquer 114, which is applied to at least a portion of the upper surface 104 of the first sheet or web of material 100.

The term "hygroscopic agent" as used herein will be understood to refer to any material which can be applied to or incorporated in a sheet or web of material or a lacquer applied to the sheet or web of material and which expands or swells upon exposure to moisture. Many types of hygroscopic agents are known to those of ordinary skill in the art and could be utilized in the manner described herein. In particular, gelatin and pectin have been utilized as hygroscopic agents in the manner described herein; however, the presently disclosed and claimed inventive concept(s) is not limited to the use of such compounds as hygroscopic agents.

The sheet or web of laminated material 90 may be shredded or cut to produce decorative grass wherein the individual strands of decorative grass are provided with a substantially linear, flat configuration. The strands of decorative grass may be packaged, stored, shipped and displayed in such a substantially linear, flat configuration, allowing the consumer to curl the decorative grass at the point of sale and/or use by exposing the strands of decorative grass to moisture. In this manner, the substantially flat, individual strands of decorative grass are more easily separated by the consumer than strands of decorative grass having curled or crimped configurations which are intertwined in a cohesive mass. In addition, such method allows for easy removal of a portion of the stands of decorative grass and easy storage of the remaining portion of the decorative grass for future use. However, it is to be understood that the presently disclosed and claimed inventive concept(s) is not limited to curling the decorative grass at the point of sale or the point of use, and decorative grass formed as described above may be curled at the point of production, if desired.

Optionally, the sheet or web of laminated material 90 may be curled by exposure to moisture prior to cutting or shredding to form decorative grass. Shown in FIG. 10 is the sheet or web of laminated material 90 which has been exposed to moisture, and therefore a curl has been formed along the length 96 thereof. Following curling of the sheet or web of laminated material 90, the curled sheet or web of laminated material 90 and/or the strands of decorative grass formed therefrom may be retained in a constrained manner as described in detail hereinabove which provides a substantially flat configuration thereto until such constraints are removed, thereby allowing the sheet or web of laminated material 90 or the strands of decorative grass formed therefrom to assume the relaxed, curled configuration.

In addition, while it is described and illustrated herein that the sheet or web of laminated material 90, and therefore the strands of decorative grass formed therefrom, is provided with a curl along the length 96 thereof, it is to be understood that the sheet or web of laminated material 90, as well as the strands of decorative grass formed therefrom, may be provided with a curl along the width 98 thereof, or the curl may be disposed diagonally and span both the length 96 and width 98 thereof.

Such strands of decorative grass may also be attached to an attachment point, as described in detail herein below. By providing an attachment point of the same material or dissimilar material to the individual strands of decorative grass, the strands of decorative grass can be manipulated in an easier manner, by holding the individual strands of decorative grass in the same manner and in substantially the same configuration and by preventing unwanted intertwining and comingling of the individual strands of decorative grass.

It is to be understood that the presently disclosed and claimed inventive concept(s) is not limited to the use of laminated materials when heat shrinkable and hygroscopic materials are utilized as activatable curling agents. For example, the decorative grass may be formed of an unlaminated sheet or web of material having a lacquer containing a hygroscopic agent disposed on at least a portion of one surface thereof. In a further alternative, a sheet or web of heat shrinkable material may be formed by extruding with a multiple extruder into the same die or into different dies two resins that contract at a different rate when heated or exposed to moisture. In yet another alternative, a sheet or web of heat shrinkable material may be formed by extruding through a multiple screw extruder or through multiple extruders by placing resin into the same die or into multiple dies different melt temperature webs and pulling the material away from the die after one of the webs has partially or completely solidified, thereby imparting stress or stretch in one of the webs which is a lesser amount of stretch than in the other web. Optionally, the before described method may be utilized with the stretch occurring after both webs have solidified. Any of the above described methods may be utilized wherein one web is mated to the other web within the flow of resin occurring at an angle to the first web, thereby imparting a differential contraction level at an angle to the machine direction, thereby facilitating production of helically curled strands of decorative grass. In addition, any of the above described methods may be utilized together and alternated so as to cause varying curls in the same strand or different strands of decorative grass cut from the same web.

Another method of causing a sheet or web of material from which decorative grass is produced to curl involves co-extruding a shrinkable material with a non-shrinkable material and heating them subsequently. Such method may be used in conjunction with pre-stretching the film at or after the time of extrusion. Indeed, any of the methods described herein which include the use of heat shrinkable materials may also be combined with the method of pre-stretching the sheet or web of material from which the decorative grass is produced.

In addition, it is also to be understood that the presently disclosed and claimed inventive concept(s) is not limited to the use of heat shrinkable and hygroscopic materials as activatable curling agents which allow the decorative grass to be curled upon activation. The presently disclosed and claimed inventive concept(s) also envisions other activatable curling agents, such as the use of chemicals which will curl the decorative grass upon treatment with solvents or other chemicals, as well as other methods of incorporating activatable curling agents which are known to those of ordinary skill in the art.

Another method of curling the decorative grass at the point of sale or the point of use involves simply stretching the strands of decorative grass to impart a curled configuration thereto.

While methods of providing decorative grass with a curled configuration have been described herein, all of the above described methods can be used to provide decorative grass with configurations other than curls. For example, rather than applying differentially expanding or contracting materials in an overall or uniform manner, such materials may be applied in a manner which allows the contracting or expanding material to be applied at only certain points, or such materials may be applied at differential thicknesses at different points, or, in the case of the hygroscopic materials, such materials may be applied with barriers to moisture absorption at certain points. Application of such materials in the above described methods results in differential folding of the strands of decorative grass, and rather than having a curl of roughly smooth and uniform dimensions, a crimped material or a combination of crimped and curled material could be achieved.

Additionally in lieu of applying the above-noted expanding or contracting materials to a sheet or web of material in the form of strips, such materials could be applied in any shape, such as a circle, so that when contraction occurs, a three dimensional configuration would be formed which could serve decorative and/or cushioning and/or insulating purposes.

In a further alternative, the strands of decorative grass need not be curled solely in a concentric or torsion spring manner or in a helical or bed spring-type manner, resulting from differential contraction or expansion across the length of the strands, but such strands could also be curled or curved due to differential contraction or expansion across the width of the strand.

Description of FIGS. 11-12B

Several methods of shredding a sheet or web of material to produce decorative grass or other decorative elements are known in the art and may be utilized to produce the decorative grass of the presently disclosed and claimed inventive concept(s) from the sheets or webs of material described herein. For example, U.S. Pat. No. 5,891,286, which has previously been incorporated herein by reference, discloses methods and apparatus for producing decorative grass and decorative elements such as glitter, and such methods may be utilized to cut the sheets or webs of material described herein to produce the decorative grass of the presently disclosed and claimed inventive concept(s). In addition, any of the methods known in the art may be utilized to shred the sheet or web of material parallel to a stretch, curl or crimp disposed therein, or perpendicular to the stretch, curl or crimp, or at an angle to the stretch, curl or crimp.

Optionally, shown in FIGS. 11 and 11A is a system 150 for producing decorative grass in accordance with the presently disclosed and claimed inventive concept(s). The system 150 is a rotary knife-type shredder assembly and includes a first set of blades 152 and a second set of blades 154. The first set of blades 152 is disposed on a first mandrel 156 and the second set of blades 154 is disposed on a second mandrel 158. Each individual blade of the first set of blades 152 has a first side 153 and a second side 155, while each individual blade of the second set of blades 154 has a first side 157 and a second side 159.

When the first mandrel 156 is rotated in a direction 160 while the second mandrel 158 is rotated in a direction 162, as illustrated in FIG. 11, the first and second set of blades 152 and 154 overlap such that the second side 155 of each individual blade of the first set of blades 152 is in contact with the first side 157 of an individual blade of the second set of blades 154 (FIG. 11A), and a sheet or web of material, such as one of the sheets or webs of laminated material 10, 50, 70 or 90 described herein above (the sheet or web of material 10 shown in FIG. 11 for illustration purposes only), is passed in between the first and second set of blades 152 and 154, thereby resulting in shredding of the sheet or web of material to form individual strands of decorative grass 164. The individual blades of the first and second set of blades 152 and 154 are positioned at a certain distance away from one another, and a gap 166 formed by this distance determines the width of the individual strands of decorative grass 164.

The system 150 can be employed to cut sheets of material so as to produce strands of decorative grass 164 having a predetermined length based on the length of the sheet of material, or the system 150 can be employed to cut rolls of material to form a shredded roll of material, in which case the individual strands of decorative grass 164 having a desired predetermined length would have to be cut from the shredded roll of material subsequent to the shredding process. Such a method of shredding a web or roll of material and subsequently cutting the shredded roll of material into individual strands of decorative grass has been disclosed in U.S. Ser. No. 09/586,901, which has previously been expressly incorporated herein by reference. Other methods of shredding a web or roll of material and subsequently cutting the shredded web or roll of material into individual strands of decorative grass are known in the art and may be utilized in accordance with the presently disclosed and claimed inventive concept(s).

Shown in FIGS. 12 and 12A is a system 150 for producing decorative grass 150a. The system 150a is similar to the system 150 described herein above, except that the system 150a has been adapted so as to leave uncut areas in the sheet or web of material passed through the system 150a which serve as a attached point for the strands of decorative grass. The system 150a includes a first set of blades 152a disposed on a first mandrel 156a and a second set of blades 154a disposed on a second mandrel 158a. When the first mandrel 156a is rotated in a direction 160a and the second mandrel 158a is rotated in a direction 162a, the blades of the first and second set of blades 152a and 154a overlap and touch with side pressure, and a gap 166a between individual blades of the first and second set of blades 152a and 154a (FIG. 12A) determine the width of individual strands of decorative grass 164a formed from a sheet or web of material (the sheet or web of material 10 illustrated in FIG. 12 for illustration purposes only) passed between the first and second set of blades 152a and 154a of the system for producing decorative grass 150a. In addition, the first mandrel 156a moves up and down at an angle, as indicated by an arrow 168 in FIG. 12A, thereby allowing the first set of blades 152a to engage and disengage the second set of blades 154a. When the first set of blades 152a disengage the second set of blades 154a, an attachment area or header 170 (FIG. 12B) is formed in which the individual strands of decorative grass 164a are connected. Shown in FIG. 12B is a group of individual strands of decorative grass 164a produced from the system 150a, wherein the individual strands of decorative grass 164a are connected to each other via the attachment area or header 170. The length of the sheet or web of material which passes through the system 150a while the first mandrel 156a is raised and the first and second set of blades 152a and 154a are disengaged determines the length of the attachment area or header 170 to which the strands of decorative grass 164a are attached.

Description of FIGS. 13-19

Shown in FIG. 13 is another system 180 for producing decorative grass 180 in accordance with the presently disclosed and claimed inventive concept(s). The system 180 is a rotary knife-type shredder which has a first set of blades 182 and a second set of blades 184. As shown in FIG. 13A, each individual blade of the first set of blades 182 has a first side 186 and a second side 188; and each individual blade of the second set of blades 184 has a first side 190 and a second side 192. The first set of blades 182 is disposed on a first mandrel 194 while the second set of blades 184 is disposed on a second mandrel 196. When the first mandrel 194 is rotated in a direction 198 and the second mandrel 196 is rotated in a direction 200, as illustrated in FIG. 13, the first and second set of blades 182 and 184 overlap, substantially as shown in FIG. 13A, such that the first side 186 of an individual blade of the first set of blades 182 touches the second side 192 of an individual blade of the second set of blades 182, while the second side 188 of an individual blade of the first set of blades 182 touches the first side 190 of an individual blade of the second set of blades 184.

A sheet or web of material, such as one of the sheets or webs of laminated material 10, 50, 70 or 90 described herein above (the sheet or web of laminated material 10 shown in FIG. 13 for illustration purposes only) may be passed between the overlapping region of the first and second set of blades 182 and 184, resulting in shredding of the sheet or web of laminated material 10 to form individual strands of decorative grass 202.

The individual blades of the first set of blades 182 are provided with a width 204, and the individual blades of the second set of blades 184 are provided with a width 206, and the widths 204 and 206 are substantially the same. The widths 204 and 206 determine the width of the individual strands of decorative grass 202.

The system 180 can cut sheets of material so as to produce strands of decorative grass 202 having a predetermined length based on the length of the sheet of material, or the system 180 can cut rolls of material to form a shredded roll of material, in which case the individual strands of decorative grass 202 having a desired predetermined length would have to be cut from the shredded roll of material subsequent to the shredding process. Such a method of shredding a web or roll of material and subsequently cutting into individual strands of decorative grass has been disclosed in U.S. Ser. No. 09/586,901, which has previously been expressly incorporated herein by reference. Other methods of shredding a web or roll of material and subsequently cutting into individual strands of decorative grass are known in the art and may be utilized in accordance with the presently disclosed and claimed inventive concept(s).

Shown in FIGS. 14 and 14A is a system 180a for producing decorative grass in accordance with the presently disclosed and claimed inventive concept(s). The system 180a is similar to the system 180 described herein above, except that the system 180a has been adapted so as to leave uncut areas in the sheet or web of material passed there through which serve as attachment area or a header for the strands of decorative grass. The system 180a includes a first set of blades 182a disposed on a first mandrel 194a and a second set of blades 184a disposed on a second mandrel 196a. As shown in FIG. 14A, each individual blade of the first set of blades 182a has a first side 186a and a second side 188a; and each individual blade of the second set of blades 184a has a first side 190a and a second side 192a. When the first mandrel 194a is rotated in a direction 198a and the second mandrel 196a is rotated in a direction 200a, as illustrated in FIG. 14, the first and second set of blades 182a and 184a overlap, substantially as shown in FIG. 14A. Thus, the first side 186a of an individual blade of the first set of blades 182a touches the second side 192a of an individual blade of the second set of blades 184a, while the second side 188a of an individual blade of the first set of blades 182a touches the first side 190a of an individual blade of the second set of blades 184a.

A sheet or web of material, such as the sheet or web of laminated material 10 shown in FIG. 14 for illustration purposes only, may be passed between the overlapping region of the first and second set of blades 182a and 184a, resulting in shredding of the sheet or web of laminated material 10 to form individual strands of decorative grass 202a.

The individual blades of the first set of blades 182a are provided with a width 204a, and the individual blades of the second set of blades 184a are provided with a width 206a, and the widths 204a and 206a are substantially the same. The widths 204a and 206a determine the width of the individual strands of decorative grass 202a.

In the system 180a, the first set of blades 182a is provided with a radius notch 208. Upon rotation of the first mandrel 194a in the direction 198a and the second mandrel 196a in the direction 200a, the region of the first set of blades 182a containing the radius notch 208 does not contact a sheet or web of material (such as the sheet or web of laminated material 10 shown in FIG. 14), and therefore the sheet or web of material which passes through the system 180a between the second set of blades 184a and the radius notch 208 of the first set of blades 182a is not cut but rather is left intact to form an attachment area or header 210 to which the individual strands of decorative grass 202a previously cut from the sheet or web of material are connected. Shown in FIG. 14B is a group of individual strands of decorative grass 202a produced from the system 180a in which the individual strands of decorative grass 202a are connected to each other via the attachment area or header 210.

Shown in FIGS. 15-19 are various stages of the system 180a for producing decorative grass. Shown in FIG. 14 is the initial contact between the radius notch 208 of the first set of blades 182a and the second set of blades 184a. In FIG. 15, a first portion of the radius notch 208 of the first set of blades 182a is in contact with the second set of blades 184a such that the sheet or web of material 10 passed therebetween is not being split but rather is forming a lower portion of the attachment area or header 210. In FIG. 16, all of the radius notch 208 of the first set of blades 182a is in contact with the second set of blades 184a such that the sheet or web of material 10 passed therebetween is forming the attachment area or header 210. In FIG. 17, a portion of the radius notch 208 of the first set of blades 182a is still in contact with the second set of blades 184a and forming an upper portion of the attachment area or header 210, while another portion of the first set of blades 182a is contacting the second set of blades 184a such that the sheet or web of material 10 passed between this connection is cut to release the strands of decorative grass 202a having the attachment area or header 210 connected thereto, and the portion of the sheet or web of material 10 is then again being shredded to form another section of individual strands of decorative grass 202a. As shown in FIGS. 18 and 19, the radius notch 208 of the first set of blades 182a moves beyond the second set of blades 184*a* such that the connection between the first and second set of blades 182*a* and 184*a* is blade-to-blade, as shown in FIG. 14A. It is important to note in FIGS. 15-19 that the first set of blades 182*a* never totally disengages the second set of blades 184*a*.

Description of FIGS. 20-20A

Shown in FIG. 20 is a system 220 for producing decorative grass in accordance with the presently disclosed and claimed inventive concept(s). The system 220 is a score cutting-style arrangement shredding process. The system 220 includes a set of blades 222 disposed on a blade mandrel 224, and a hardened mandrel 226, which is made of a substantially shape sustaining material. The set of blades 222 disposed on the blade mandrel 224 are in downward physical contact with the hardened mandrel 226. A sheet or web of material, such as the sheet or web of laminated material 10 shown in FIG. 20 for purposes of illustration only, is passed between the blade mandrel 224 and the hardened mandrel 226, and when the blade mandrel 224 is rotated in a direction 228 and the hardened mandrel 226 is rotated in a direction 230, the sheet or web of material comes into contact with the set of blades 222 and is shredded to form individual strands of decorative grass 232. The individual blades of the set of blades 222 are disposed at a distance 234 from each other, and the distance 234 determines the width of the individual strands of decorative grass 232.

The system 220 can produce individual strands of decorative grass 232 from sheets of material wherein the strands of decorative grass 232 have a predetermined length based on the length of the sheet of material, or the system 220 can cut rolls of material to form a shredded roll of material, in which case the individual strands of decorative grass 232 having a desired predetermined length would have to be cut from the shredded roll of material subsequent to the shredding process. Such a method of shredding a web or roll of material and subsequently cutting into individual strands of decorative grass has been disclosed in U.S. Ser. No. 09/586,901, which has previously been incorporated by reference herein. Other methods of shredding a web or roll of material and subsequently cutting into individual strands of decorative grass are known in the art and may be utilized in accordance with the presently disclosed and claimed inventive concept(s).

Figure 21:
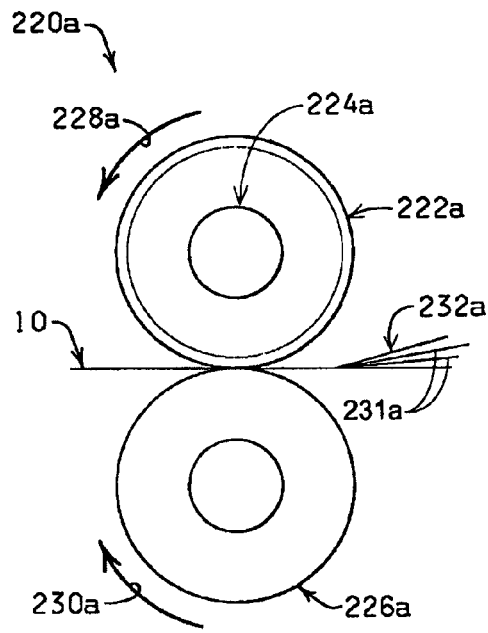
FIG. 21 is another embodiment of a system for producing decorative grass in accordance with the presently disclosed and claimed inventive concept(s).
Figure 21A:
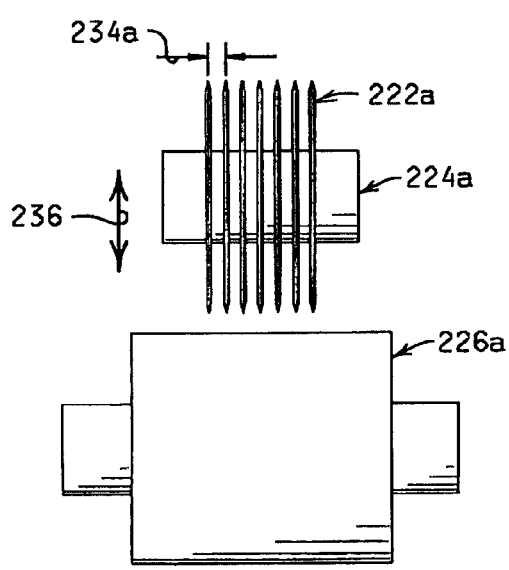
FIG. 21A is a schematic representation of a set of blades disposed on a blade mandrel and in contact with a hardened mandrel of the system for producing decorative grass of FIG. 21, wherein the blade mandrel may be raised such that the set of blades are disengaged from the hardened mandrel.
Figure 21B:
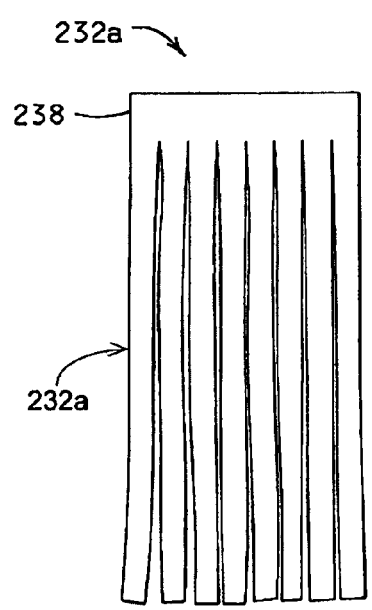
FIG. 21B is a perspective view of strands of decorative grass produced from the system for producing decorative grass of FIG. 21 wherein the strands of decorative grass are connected to a header.

Description of FIGS. 21-21B

Shown in FIGS. 21 and 21A is a system 220*a* for producing decorative grass in accordance with the presently disclosed and claimed inventive concept(s). The system 220*a* is similar to the system 220 described herein above, except that the system 220*a* has been adapted so as to leave uncut areas in the sheet or web of material passed there through which serves as an attachment area for the strands of decorative grass. The system 220*a* includes a set of blades 222*a* disposed on a blade mandrel 224*a*, and a hardened mandrel 226*a*, which is made of a substantially shape sustaining material. The set of blades 222*a* disposed on the blade mandrel 224*a* are in downward physical contact with the hardened mandrel 226*a*. A sheet or web of material, such as the sheet or web of laminated material 10 shown in FIG. 21 for purposes of illustration only, is passed between the blade mandrel 224*a* and the hardened mandrel 226*a*, and when the blade mandrel 224*a* is rotated in a direction 228*a* and the hardened mandrel 226*a* is rotated in a direction 230*a*, the sheet or web of material 10 comes into contact with the set of blades 222*a* and is shredded to form individual strands of decorative grass 232*a*. The individual blades of the set of blades 222*a* are disposed at a distance 234*a* from each other, and the distance 234*a* determines the width of the individual strands of decorative grass 232*a*.

In addition, the blade mandrel 224*a* moves up and down off of the hardened mandrel 226*a* by use of an air cylinder or cam in the directions indicated by an arrow 236 (FIG. 21A), thereby raising the set of blades 222*a* out of contact with the hardened mandrel 226*a* and thus the sheet or web of material 10 passed between the blade mandrel 224*a* and the hardened mandrel 226*a*. When the blade mandrel 224*a* is moved in an upward direction as indicated by the arrow 236 such that the set of blades 222*a* disengage the hardened mandrel 226*a*, an attachment area or header 238 (FIG. 21B) is formed in which the individual strands of decorative grass 232*a* are connected. Shown in FIG. 21B is a group of individual strands of decorative grass 232*a* produced from the system 220*a* wherein the individual strands of decorative grass 232*a* are connected to each other via the attachment area or header 238. The length of the sheet or web of material which passes through the system for producing decorative grass 220*a* while the blade mandrel 224*a* is raised in the direction indicated by the arrow 236, so as to disengage the set of blades 222*a* from the hardened mandrel 226*a* determines the length of the attachment area or header 238 to which the strands of decorative grass 232*a* are attached.

Description of FIGS. 22 and 23

Shown in FIG. 22 are two sheets of curlable segments of decorative grass 250. The two sheets of curlable segments of decorative grass 250 are substantially normally disposed relative to one another; and each sheet of curlable segment of decorative grass 250 has a plurality of individual segments 252 connected to an attachment area or header 254. The sheets of curlable decorative grass 250 can be fabricated of any of the materials herein before described so that a curl can be imparted to the sheets of curlable decorative grass 250 at or near the point of sale or use of one or more sheets of curlable decorative grass 250. Any method for imparting a curl to the segments 250 of the curlable sheets of curlable decorative grass 250 herein before described can be employed and the particular method chosen will be determined by the end user. However, it should be understood that the method for imparting a curl to the segments 250 is not limited to the methods described herein, but include any method and/or apparatus known within the art. For example, the methods and apparatus for providing a curl to the segment 250 or to any sheet and/or web of material hereinbefore or hereinafter described include the methods and apparatus disclosed in U.S. Pat. No. 6,436,324 B1, entitled "Method for Making Curled Decorative Grass", issued to Weder et al on Aug. 20, 2002, the entire contents of which is hereby expressly incorporated herein by reference.

While only two sheets of curlable decorative grass 250 have been shown, it should be understood that additional sheets of curlable decorative grass 250 can be employed to form a start of sheets of curlable decorative grass, and that each of the sheets and curlable decorative grass 250 has been shown as a single sheet or layer, laminates can also be employed as the sheet of curlable decorative grass 250.

Shown in FIG. 23 are two sheets of decorative grass 260 wherein a distortion, such as a curl, has been imparted to each of the sheets of the decorative grass 260. It should be noted that while the distortion has been shown as a curl, the distortion may be a crimp and/or a crimp and a curl as herein before described. The two sheets of decorative grass 260 are substantially normally disposed relative to one another; and each sheet of decorative grass 260 has a plurality of segments 262 connected to an attachment area or header 264. The sheets of decorative grass 260 can be fabricated of any of the materials herein before described; and as previously stated, the distortion can be formed utilizing any method herein before described or known and can include curls having various configurations, crimps and combination of curls and crimps, included but not limited to the methods and apparatus disclosed in U.S. Pat. No. 6,436,324 B1 which has been previously incorporated herein by reference. The segments 262 of each of the sheets of decorative grass 260 are desirably retained in a substantially flattened condition prior to use at or near the point of sale. To ensure that the segments 262 of each of the sheets of decorative grass 260 are maintained in a substantially flat condition prior to use and/or sale, the sheets of decorative grass 260 may be disposed in a bag or package of sufficient rigidity which is sized to retain the sheets of decorative grass in a substantially flat configuration, thus preventing the segments 262 of the sheets of decorative grass 260 from curling or being distorted prior to use and/or sale.

Figure 24:
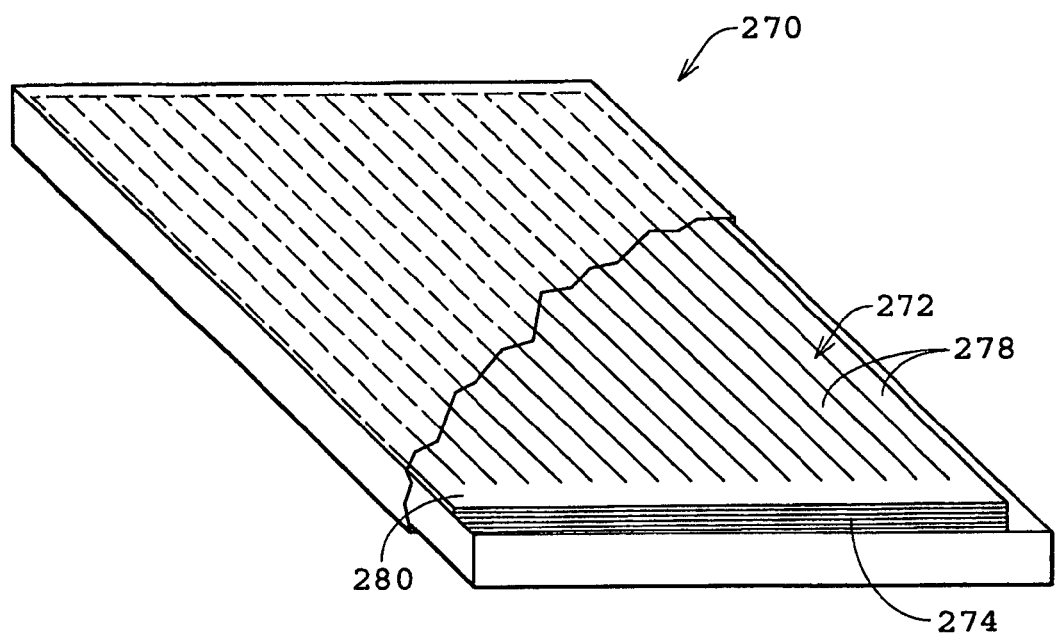
FIG. 24 is a partially cutaway perspective view of a package containing a plurality of sheets of curlable material, the sheets containing a plurality of segments connected to a header and the package having a curling tool connected thereto.

Description of FIG. 24

Referring now to FIG. 24 shown therein is a cutaway perspective view of a package 270 containing a plurality of sheets 271 which have been at least partially cut to provide side by side strips 272 which can be curled to form curled decorative grass. The package 270 includes an enclosure or box 273 having an opening 274 near one end 275 thereof and a curling tool 276 disposed within or aligned with the opening 274 such that upon pulling one of the sheets 271 from the package 270 and drawing the sheet 271 over the curling tool 276, a curl is imparted to the strips 272 of the sheets 271 at or near the point of use or sale of one or more of the sheets 271. While the package 270 is shown as being a substantially rectangular shaped enclosure 273 sized and configured to contain a plurality of sheets 271, it should be understood that the package 270 can be provided with any suitable configuration as long as it is capable of containing the sheets, such as the sheets 271.

The sheets 271, in addition to the plurality of side by side strips 272 include an attachment area or header 278 to which the strips 272 are connected. It should be noted that while the enclosure 270 has been shown as containing a plurality of sheets 271, individual strips which can be curled by pulling over the curling tool 276 to impart the desired curl thereto can be stored within the enclosure 273, and the package 270 may include a roll of material (not shown) formed of a plurality of side by side strips. When using a roll of material, a predetermined amount of a material is unrolled and passed over the curling tool 276. The curled strips of material are then severed from the roll of material by any conventional cutting element, such as scissors, a cutting edge and the like.

The material from which the sheets are fabricated can be any of the materials herein before described, including laminates thereof. Similarly, the curling tool can be any curling tool well known in the art and can be a single bar curling tool, a multiple bar curling tool and the like. The configuration of the curling tool, as well as the number of curling tools employed will vary depending upon the particular configuration of curl imparted to the sheet of material and the and/or strips.

While the curling tool 276 has been shown as being incorporated into the package 270 (FIG. 24), it should be understood that the curling tool 276 assembly can be located separate of the package 270, in which case the curling tool will desirably be positioned near the point of sale and/or use of the decorative grass.

Several prior art methods and apparatus can be employed for providing a curl or a crimp to the sheet or strand of decorative grass. An example of such a method and apparatus is disclosed in U.S. Pat. No. 5,891,286, and U.S. Pat. No. 6,436,324, each of which has previously been incorporated herein by reference. However, is to be understood that the method and apparatus for imparting a curl to sheet of decorative grass is not limited to the use of such methods and apparatus, and any method known in the art for providing a curl and/or crimp to a sheet or strand of material may be utilized in accordance with the presently disclosed and claimed inventive concept(s) for imparting a curl and/or crimp to a sheet or strand of material removed from a package.

It is to be understood that any method of forming the decorative grass of the presently disclosed and claimed inventive concept(s), such as the systems for producing decorative grass described herein as well as any method known in the art, could be performed in line with an extrusion operation using razor blades or any other cutting method, shredding in wider strips and stretching these strips to form narrower and thinner strips.

As stated above, the sheet or web of material from which the decorative grass is produced may be provided in a substantially flat configuration and cut or shredded to produce strands of decorative grass having a substantially flat configuration, or the sheet or web of material from which the decorative grass is produced may be curled prior to cutting. The sheet or web of material may be placed under stress, causing the sheet or web of material to temporarily assume a substantially flat configuration, and upon shredding, the strands of decorative grass formed therefrom may be retained in the substantially flat configuration until curling or crimping is desired, or the strands of decorative grass cut from the sheet or web of material may be allowed to curl or crimp upon shredding from the sheet or web of material. In a third option, the sheet or web of material may be curled and cut or shredded in such a curled or crimped configuration. The strands of decorative grass formed therefrom may then be exposed to sufficient pressure to cause the strands of decorative grass to assume a substantially flat configuration until crimping or curling is desired, at which time the strands of decorative grass are released from such pressure and allowed to relax and curl or crimp. Any of the above described embodiments may also be employed with strands of decorative grass attached at an attachment area or header.

Changes may be made in the construction and the operation of the various components, elements and assemblies described herein or in the steps or the sequence of steps of the methods described herein without departing from the spirit and scope of the inventive concept(s) as defined in the following claims.

What is claimed is:

1. A pad of decorative grass, comprising:
   a first layer of curled segments of decorative grass, the curled segments laid side by side in a flattened configuration;
   a second layer of curled segments of decorative grass, the curled segments laid side by side in a flattened configuration; and
   wherein the first layer is crosslaid on the second layer so that the curled segments of the first layer are substantially perpendicular to the curled segments of the second layer.

2. The pad of claim 1, wherein each of the layers has a header to which all the curled segments of decorative grass of that layer are connected.

3. The pad of claim 1, wherein the curled segments of decorative grass of any layer are unconnected to adjacent segments of the same layer or to the segments of any adjacent layer.

4. The pad of claim 1, wherein the first and second layers face each other so that the curling action of the first layer curls into the curling action of the second layer.

* * * * *

UNITED STATES PATENT AND TRADEMARK OFFICE
CERTIFICATE OF CORRECTION

PATENT NO. : 8,757,430 B2  
APPLICATION NO. : 13/483203  
DATED : June 24, 2014  
INVENTOR(S) : Donald E. Weder Page 1 of 1

It is certified that error appears in the above-identified patent and that said Letters Patent is hereby corrected as shown below:

On the Title Page:
item (73) Assignee: After "U/T/A" insert -- dated Dec. 8, 1995 --

Signed and Sealed this
Ninth Day of September, 2014

Michelle K. Lee
*Deputy Director of the United States Patent and Trademark Office*